US009086192B2

(12) United States Patent
Möller

(10) Patent No.: US 9,086,192 B2
(45) Date of Patent: Jul. 21, 2015

(54) LIGHT MODULE HAVING A COVER WITH A PLURALITY OF OPTICAL SYSTEMS, EACH OPTICAL SYSTEM HAVING A PLURALITY OF OPTICAL REGIONS AND OPTICAL ELEMENTS

(71) Applicant: Hella KGaA Hueck & Co., Lippstadt (DE)

(72) Inventor: Dennis Möller, Lippstadt (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 159 days.

(21) Appl. No.: 13/963,189

(22) Filed: Aug. 9, 2013

(65) Prior Publication Data

US 2014/0043809 A1 Feb. 13, 2014

(30) Foreign Application Priority Data

Aug. 10, 2012 (EP) .................................... 12180155

(51) Int. Cl.
*F21K 99/00* (2010.01)
*G02B 19/00* (2006.01)
(Continued)

(52) U.S. Cl.
CPC ... *F21K 9/50* (2013.01); *F21V 3/02* (2013.01); *F21V 5/004* (2013.01); *F21V 5/007* (2013.01); *F21V 5/04* (2013.01); *F21V 5/08* (2013.01);
(Continued)

(58) Field of Classification Search
CPC ........... F21V 5/007; F21V 5/004; F21V 5/04; F21V 5/045; G02B 3/08; G02B 2003/0093; G02B 19/0066; G02B 19/0061; F21Y 2101/02
USPC ............................................. 362/311.02, 244
See application file for complete search history.

(56) References Cited

U.S. PATENT DOCUMENTS

2003/0202241 A1  10/2003  Blumel .......................... 359/726
2008/0043466 A1   2/2008  Chakmakjian ................ 362/240

FOREIGN PATENT DOCUMENTS

DE  697 34 234    7/2006
EP   0 874 964   11/1998
(Continued)

OTHER PUBLICATIONS

Extended European Search Report in European Patent Application No. 12180155.9 dated Jul. 30, 2013.

*Primary Examiner* — Robert May
(74) *Attorney, Agent, or Firm* — Norton Rose Fulbright US LLP

(57) ABSTRACT

A light module for an exterior light, comprises a circuit board holder, at least one circuit board disposed in the circuit board holder comprising a plurality of LEDs and a cover which covers the circuit board holder and the circuit board disposed therein. Embodiments of the cover comprise a transparent cover which is permeable to light in order to transmit light produced by the LEDs. An optical system for influencing the beam path through the transparent cover may be disposed on the inner side of the transparent cover for each LED. Each optical system can comprise a central optical element, which is disposed directly above the LED, two outer optical regions on the opposite sides of the central optical element, a second optical element which laterally encloses the central optical element and the two outer optical regions and has at least one longitudinal side and a third optical element which extends linearly outside the second optical element parallel to a longitudinal side.

14 Claims, 8 Drawing Sheets

(51) Int. Cl.

| | | |
|---|---|---|
| *F21V 5/00* | (2015.01) | |
| *F21V 3/02* | (2006.01) | |
| *F21V 5/04* | (2006.01) | |
| *F21V 5/08* | (2006.01) | |
| *G02B 3/00* | (2006.01) | |
| *F21S 2/00* | (2006.01) | |
| *F21W 131/103* | (2006.01) | |
| *F21Y 101/02* | (2006.01) | |
| *F21Y 105/00* | (2006.01) | |

(52) U.S. Cl.
CPC ........ *G02B 19/0061* (2013.01); *G02B 19/0066* (2013.01); *F21S 2/005* (2013.01); *F21W 2131/103* (2013.01); *F21Y 2101/02* (2013.01); *F21Y 2105/001* (2013.01); *G02B 2003/0093* (2013.01)

(56) References Cited

FOREIGN PATENT DOCUMENTS

| | | |
|---|---|---|
| EP | 2 071 230 | 6/2009 |
| EP | 2565696 A1 * | 3/2013 |
| EP | 2804029 A2 * | 11/2014 |
| WO | WO/97/26483 | 7/1997 |
| WO | WO/2011/023927 | 3/2011 |

\* cited by examiner

LIGHT MODULE HAVING A COVER WITH A PLURALITY OF OPTICAL SYSTEMS, EACH OPTICAL SYSTEM HAVING A PLURALITY OF OPTICAL REGIONS AND OPTICAL ELEMENTS

PRIORITY CLAIM

This application claims priority to pending European Application No. 12180155.9 filed on 10 Aug. 2012.

BACKGROUND OF THE INVENTION

1. Field of the Invention

The invention relates to a light module for an exterior light, a cover for a light module and an exterior light having at least one light module.

2. Description of Relevant Art

Light modules for exterior lights and corresponding exterior lights are known. for example, from EP 0 874 964 A. They are used to at least partially illuminate outdoor areas. For this purpose the individual light modules for exterior lights are provided with illuminants which are able to emit light through a transparent cover which is permeable to light. In order to focus, concentrate or guide the light produced by the illuminants, in particular the light produced by LEDs, in a desired manner, optical systems, frequently in the form of lens systems, are provided in known light modules. In this case, in order to be able to efficiently concentrate and focus the entire quantity of light for each individual illuminant, for example, in the case of a plurality of individual LEDs, its own optical system can be used for each individual illuminant. Thus, for example, in the case of LEDs a lens system can be placed on each LED. Alternatively to this, as disclosed in EP 0 874 964 A, it is possible that the transparent cover itself is a single optical system for all illuminants. A disadvantage with a single optical system for all illuminants is the lack of influence on the focusing of the light of the individual illuminants. The disadvantage of a plurality of individual optical systems is the high degree of complexity and the associated high assembly expenditure.

SUMMARY OF THE INVENTION

The embodiments are based on the object of to at least partially eliminate the previously described disadvantages of known light modules. In particular, it is the object of the embodiments to provide a light module, a cover for a light module and an exterior light having at least one light module which provide the manufacture and assembly of plurality of optical systems for all illuminants in an inexpensive and simple manner. In particular, a particularly cleaning-friendly design should be provided.

In an embodiment, a light module for an exterior light comprises a circuit board holder and at least one circuit board disposed in the circuit board holder comprising a plurality of illuminants. The illuminants in particular comprise LEDs, so-called light emitting diodes. Furthermore, a cover is provided, which covers the circuit board holder and the circuit board disposed therein, and comprises a transparent cover which is permeable to light in order to transmit the light produced by the illuminants. In other words, the cover is configured in a transparent manner at least in a certain region as transparent cover. Preferably a plastic is provided as material for the cover, so that the entire cover can be produced by injection moulding.

In another embodiment, a light module is characterized in that on the inner side of the transparent cover an optical system for influencing the beam path through the transparent cover is provided for each illuminant. In other words, the optical system for each illuminant is in particular restricted to the inner side of the transparent cover. The outer side is unimpaired so that the outer side of the transparent cover can be shaped substantially freely. The free shapability of the outer side of the transparent cover brings with it freer design possibilities for the optical shaping of the transparent cover. In particular it is possible in this way to print parts of the outer side of the transparent cover or configure them to be completely flat. Thus, additional design features and also an improved scope for cleaning the entire light module can be provided. Dirt particles adhere less easily to a freely designable outer side of the transparent cover, in particular to a smooth outer side.

Furthermore, an improved light distribution is possible as a result of forming the optical system on the inner side. In particular, respectively one optical system is provided for respectively one illuminant. In this way, it is possible to provide a plurality of optical systems for a plurality of illuminants which are all integrated in a single component, i.e. the cover disk of the cover. Thus, the complexity of the entire system of the light module is reduced many times. As a result of the assembly of the transparent cover, the assembly of the optical systems is also accomplished automatically so that a plurality of assembly steps are eliminated. Furthermore, manufacture is simplified since a single component in the form of the transparent cover has all the optical systems for all the illuminants.

In another embodiment, the optical systems are provided on the inner side, preferably only on the inner side of the transparent cover. The optical systems are thus protected from being influenced from outside. In particular, mechanical adverse effects due to solid particles such as, for example, hailstones are kept away from the optical system in this way so that a mechanical protection exists. A mechanical influencing, in particular a mechanical destruction of the optical systems is thereby eliminated or a corresponding danger is reduced. A further advantage of a light module is, that the optical systems and the transparent cover are a single component. Accordingly, light coming from each illuminant must only traverse this single component. Accordingly, the loss is reduced significantly so that an increased optical efficiency of, in particular, greater than 90% is achievable. Therefore in turn illuminants which are smaller and more cost-effective because they are weaker can be used.

In a further embodiment, an optical system comprises at least one central optical element, which is preferably disposed directly above the illuminant or the LED. Adjoining the central optical element are two outer optical regions on the opposite sides of the central optical element. The central optical element and the outer optical regions are laterally enclosed by a second optical element. Finally a third optical element which runs parallel to a longitudinal side of the second optical element is preferably provided.

It can be advantageous if the outer side of the transparent cover is configured to be planar in a light module. Preferably, in a light module the optical systems are formed integrally, most preferably monolithically with the transparent cover. Due to the planar configuration, the outer side of the optical system is even easier to clean. Furthermore, a cleaning interval of greater duration can be provided since contaminants can adhere less easily to a planar plane. Planar outer surface is to be understood here as substantially a flat surface, in particular a flat surface. This means that curvatures or distortions are not present and in particular an optical influencing of the outer side is eliminated. In addition, with a planar outer side of the transparent cover, it is possible to print this or stick with film. This enables light filters to be provided in the outer side of the transparent cover particularly cost-effectively and simply. The provision of lettering which is reproduced in the light image on the base of the illuminated area can also be implemented easily in this way. The integral, in particular monolithic configuration produces a simplification with regard to the manufacturing process. Thus transparent cover and optical system can be produced in a single step, for example, by an injection moulding process. Furthermore, the expenditure for the installation is even smaller and the installation itself is speeded up. Naturally even despite the integral, in particular monolithic manner of formation, different materials, for example, by a two-component injection moulding, are feasible.

It is a further advantage if in a light module the optical systems are configured for an asymmetric distribution of the light. In particular, all the systems in this case are configured to be identical or substantially identical to one another. This significantly simplifies the manufacture and the development of such an optical system. As a result of the asymmetric distribution of the light, complex illumination shapes can also be achieved. In particular, it is possible to go over from simple round illumination areas to rectangular illumination shapes. Furthermore, as a result of the asymmetric distribution of the light it is possible to achieve a substantially constant illumination over the entire light area even with complex illumination areas. Also edge zones which otherwise tend to become blurred with the surroundings can be substantially completely illuminated in this way. In other words, the light-dark boundary between the illuminated area and the dark area can be indicated more sharply in this way.

Furthermore, at least one optical system may be formed by a recess on the inner side of the transparent cover. This recess is preferably designed in such a manner that it can accommodate the LEDs, i.e. the illuminants, in this recess. Furthermore, the recess can be configured in such a manner that the maximum extension of the transparent cover in the thickness comes in contact with the circuit board holder and/or the circuit board. In other words, it can be advantageous if the transparent cover clamps the circuit board between itself and the circuit board holder. Thus each individual illuminant is accommodated in such a recess and so to speak encased by it. A design is thereby achieved such as could only be achieved hitherto by a plurality of individual optical systems, i.e. by placement of individual lens systems on each single illuminant. As a result of the arrangement, such individual optical systems are provided for each individual illuminant but due to the formation in the transparent cover, a simple assembly of all the optical systems can be achieved at the same time with complete encasing. In addition to this advantage, a particularly flat design of the entire light module is possible. The manufacture and also the assembly and furthermore the transport or the required installation space for such a light module is overall optimized.

The optical systems may be configured as a recess or as an elevation on the inner side. In this way, optically active surfaces are formed which result in an influencing of the beam path by the transparent cover in a desired manner. In this embodiment the optical systems are preferably lens systems and/or reflector systems which are used for different refraction/reflection of light.

Preferably, in a light module each optical system has a first cross-section in a first cross-sectional plane and a second cross-section in a second cross-sectional plane perpendicular to the first cross-sectional plane, wherein the first cross-section and the second cross-section are formed differently. This means that an asymmetric configuration profile is provided for the individual cross-sections, overall therefore for the optical system. This applies in particular if the optical system comprises a recess on the inner side of the transparent cover. The asymmetric configuration with regard to the individual cross-sections supports an advantageous asymmetric illumination in the light area of the light module.

In a further embodiment, the central optical element has at least one concave section in the first cross-section.

It is furthermore advantageous if the two outer optical regions are configured to be convex in the first cross-section.

In a further advantageous embodiment, preferably one connecting section is provided between the central optical element and the two outer optical regions. Particularly preferably this connecting section runs parallel to the beam path from the LED. Consequently light in the beam path from the LED is not influenced by the connecting section. Preferably a broadening of the entire optical system is thereby possible without light being lost and at the same time a broadening of the influence of the beam path produced from the illuminant becomes possible. Furthermore, the individual optically active regions or elements can be arranged freely with respect to one another without the light alignment being influenced by additional optically active surfaces.

Particularly preferably the second optical element has convex sides in the first cross-section. It is further preferred if the second optical element has convex sides in the second cross-section and at least one concave side. By this means an overlap of the beam path after leaving the transparent cover is produced. This overlap produces variously strong focussings which are reflected in particular in an increased quantity of light in the edge zone of the illuminated area. The edge zone is thereby illuminated more strongly so that an improved edge illumination and therefore a large range can be achieved. Naturally a plurality of concave sections can also follow the central convex section. Preferably the concave section inter alia form a nose-shaped continuation. An almost complete encasing of the illuminant is made possible by this continuation of the concave design. Thus, a large proportion of the light generated by the respective illuminant can be received and used by an optically active surface, i.e. by the convex and concave sections. This also serves to use weaker-light and therefore more cost-effective illuminants since the light produced can be used almost completely for the desired illumination. The "surrounding" can be accomplished in this case both directly and indirectly. In particular in this way, individual optically active surfaces can be connected by optically inactive or less active surfaces, in particular flat surfaces.

It is preferred if the third optical element (75) has convex sides in the second cross-section.

It is also advantageous if in a light module the illuminants are disposed outside the centre of the respective optical system. It should be understood by this that the centre in relation to at least two directions of symmetry, i.e. in relation to at least two cross-sectional plane perpendicular to one another is to be understood as the central alignment of the optical system. The illuminant is provided outside this centre so that an asymmetric alignment of the light distribution can be achieved even more easily.

A further embodiment is a cover for a light module or an exterior light having the features of a light module, further comprising a transparent cover having an optical system for influencing the beam path through the transparent cover disposed on the inner side thereof for each illuminant. A cover is used for a light module and is configured accordingly so that the same advantages come into consideration for this such as have been explained in detail with reference to a light module.

Another embodiment is an exterior light having at least one light module. Accordingly the same advantages also apply here as have been explained in detail with reference to a light module.

Features and details which have been described in connection with the embodiments of a light module, may also apply to the cover and/or the exterior light and conversely in each case so that reference is made or can always be made alternately with regard to the disclosure on the individual aspects of the various embodiments.

BRIEF DESCRIPTION OF THE DRAWINGS

In the following, the invention will be described by way of example, without limitation of the general inventive concept, on examples of embodiment and with reference to the drawings.

Figure 1:
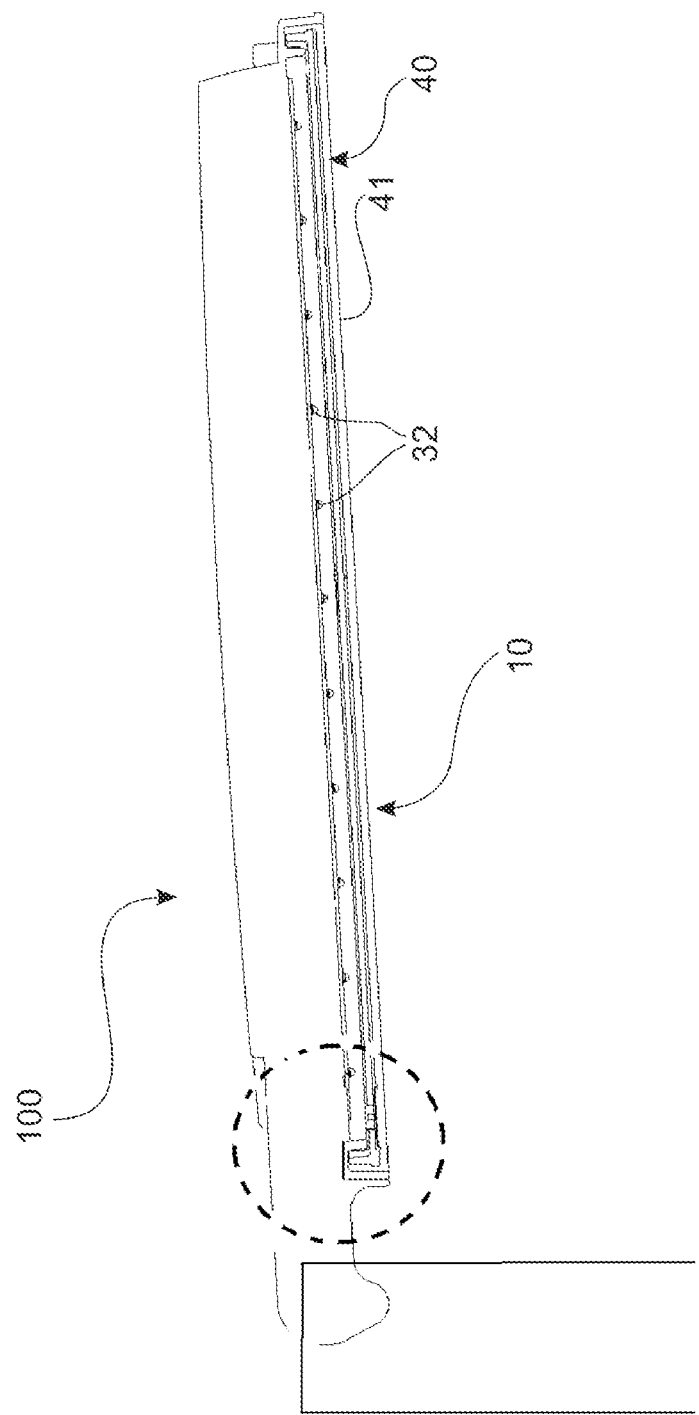
FIG. 1 shows a first embodiment of an exterior light.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 shows a first embodiment of a light module 10. This is inserted in an exterior light 100 from below and connected non-positively to this. The exterior light 100 is in turn fastened to a holder, in particular to a mast. The light module 10 of this embodiment is fitted with a plurality of illuminants 32 which in this embodiment are LEDs. The illuminants 32 are covered with a transparent cover 41 which is part of a cover 40. The frame of the cover 40 is incorporated in a housing of the exterior light 100 and connected mechanically to this.

Figure 2:
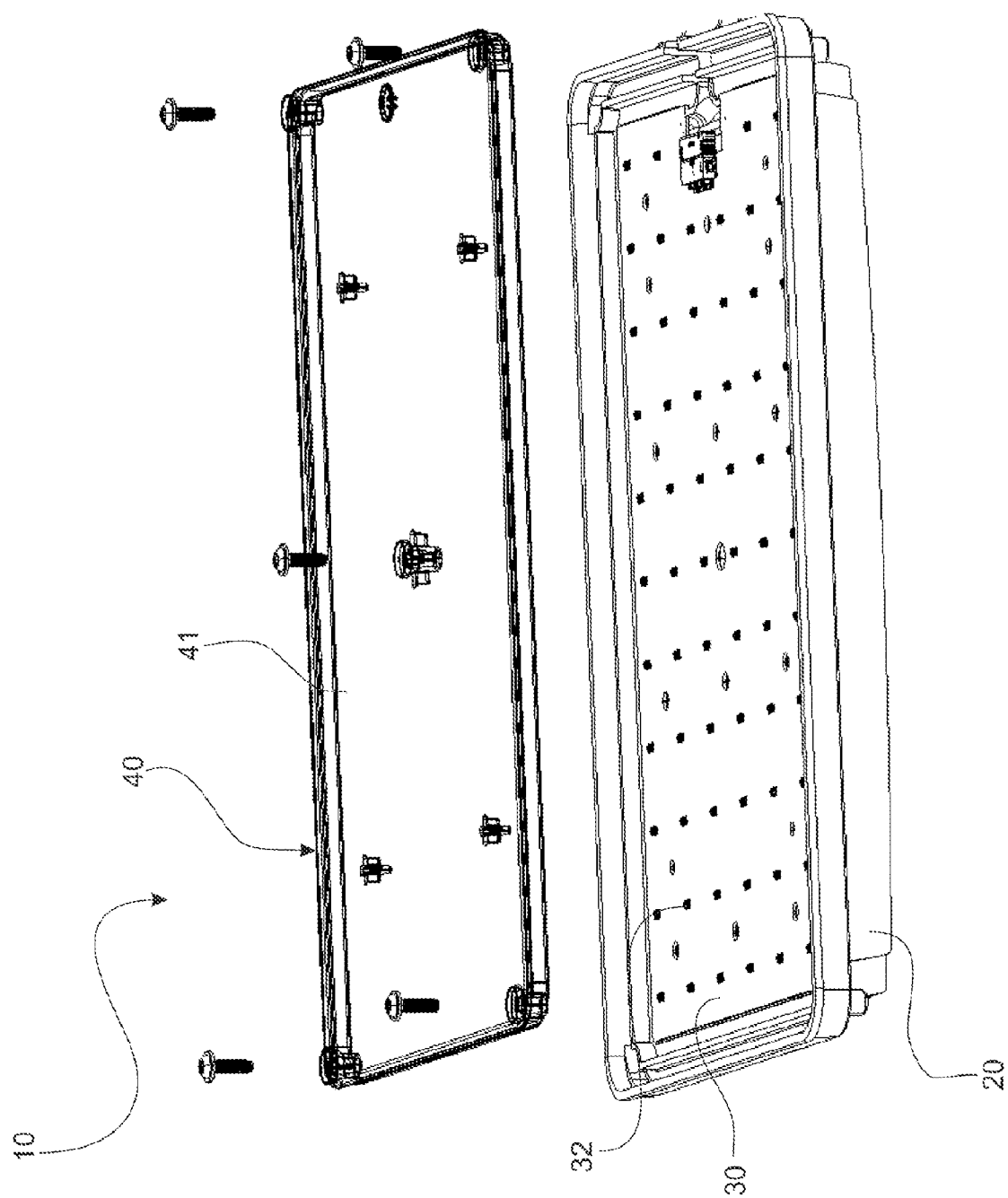
FIG. 2 shows components of a light module.

One embodiment of such a light module 10 can be seen, for example, from FIG. 2. There it can be clearly seen that a circuit board holder 30 has the plurality of illuminants 32 in the form of LEDs. This circuit board 30 and therefore also the illuminants 32 is enclosed between two components, i.e. the cover 40 and the circuit board holder 20. These terminate the circuit board 30 substantially tightly so that the illuminants 32 and the circuit board 30 are disposed protected therein.

Figure 3:
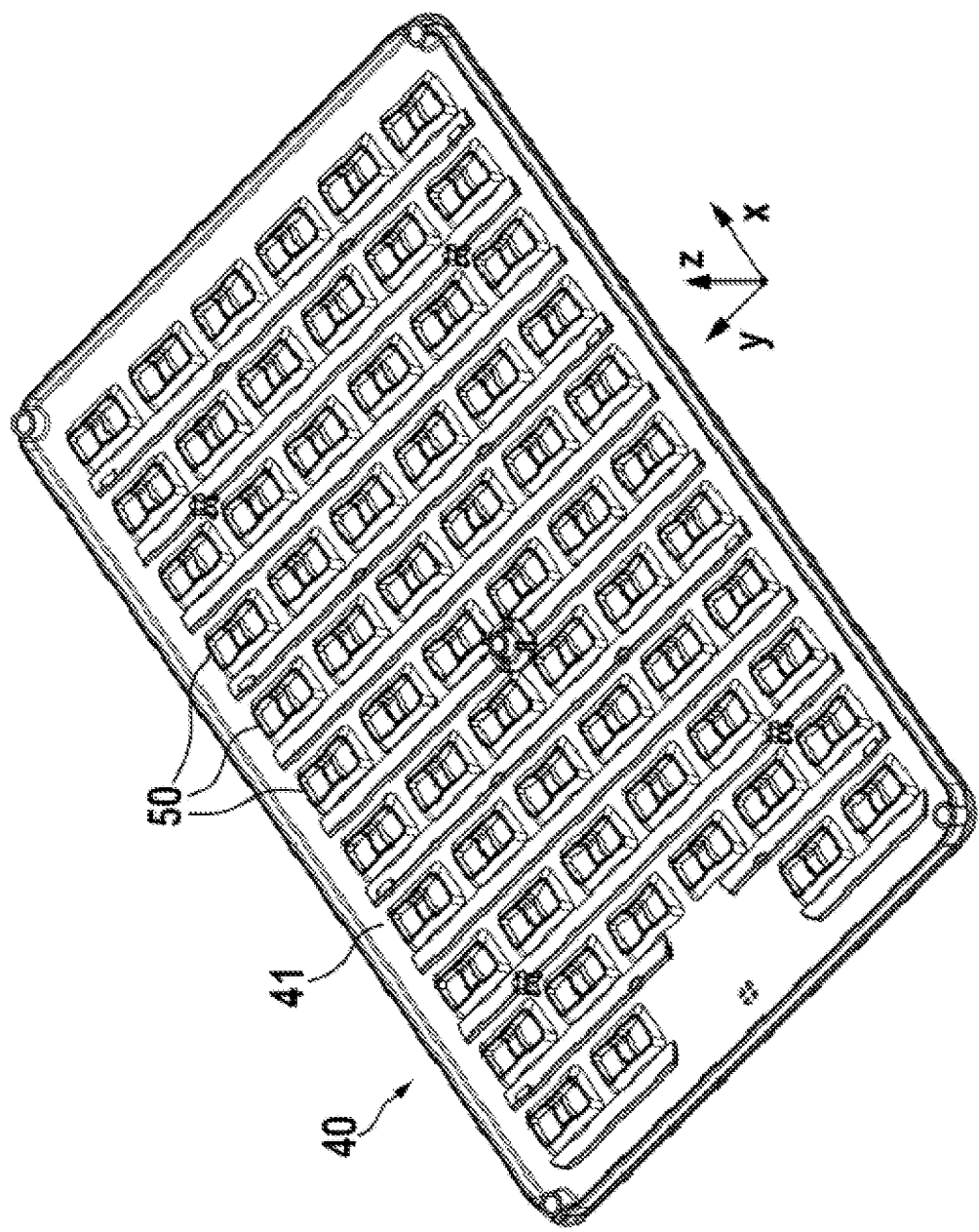
FIG. 3 shows further components of a light module.

FIG. 3 shows an embodiment of a cover 40. This is provided with a plurality of optical systems 50 in the transparent cover 41. The transparent cover 41 is preferably made of plastic in order to produce a transparent region inexpensively. The individual optical systems 50 are assigned to each illuminant 32 so that by inserting the cover 40 all the optical systems 50 are automatically assembled simultaneously and assigned to the illuminants 32. A coordinate system with three axes x, y and z is also shown here to facilitate the spatial assignment. The x axis points away from the holder of the light unit in the longitudinal direction of the arrangement shown here in a plane of the transparent cover 41. The y axis runs transversely to this, also in the plane of the transparent cover 41. The z axis is perpendicular to the two aforesaid axes.

Figure 4:
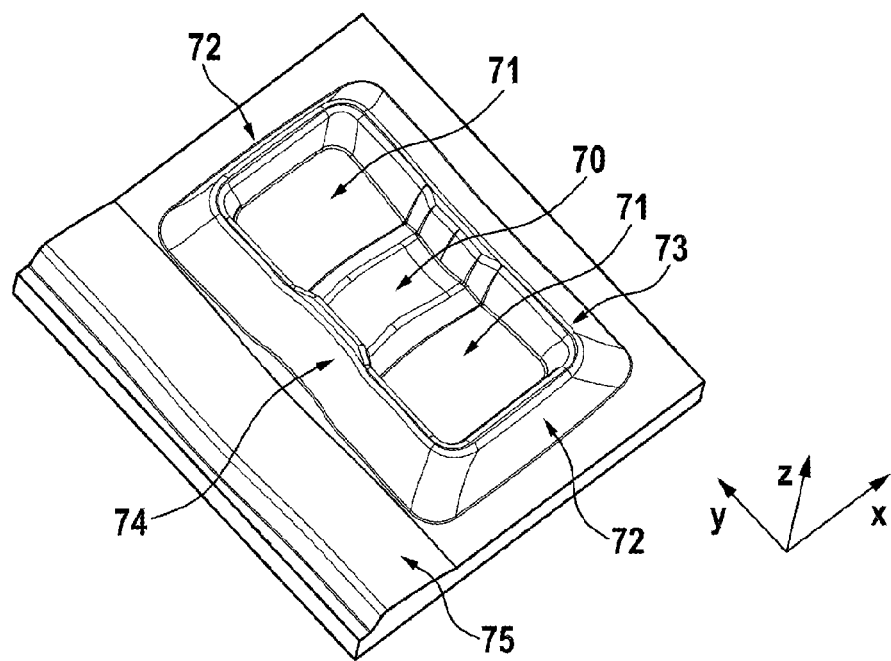
FIG. 4 shows an optical system in a first view.

FIG. 4 shows an optical system in a first view. The alignment of the coordinate system corresponds to the preceding figure. A central optical element 70 is enclosed by a second optical element having the transverse sides 72 and the longitudinal sides 73 and 74. This further encloses the outer optical regions 71 which lie on opposite sides adjacent to the central optical element. Even more preferably a third optical element 75 is located behind the longitudinal side 74 of the second optical element. The third optical element 75 is preferably approximately linear. Thus, a common longer third optical element 75 can thus be provided for a multiplicity of optical systems 50 as shown, for example, in FIG. 3.

Figure 5:
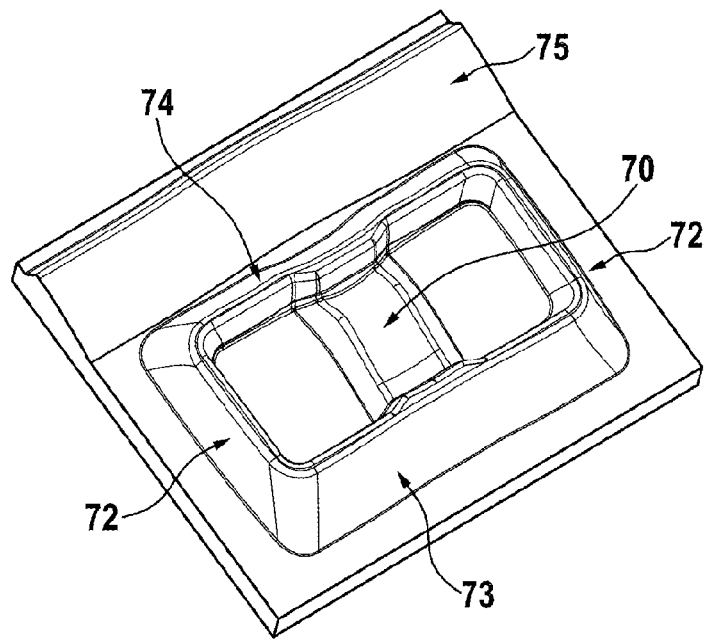
FIG. 5 shows an optical system in a second view.

FIG. 5 shows the optical system in a view which is rotated with respect to the previous view.

Figure 6:
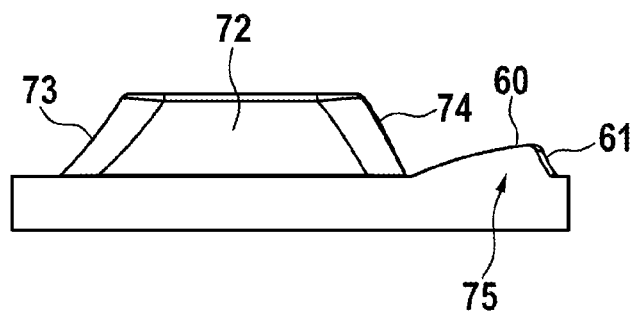
FIG. 6 shows an optical system in a side view.

FIG. 6 shows the optical system in a side view. Here two preferably convex sides 60, 61 of the third optical element 75 are shown.

Figure 7:
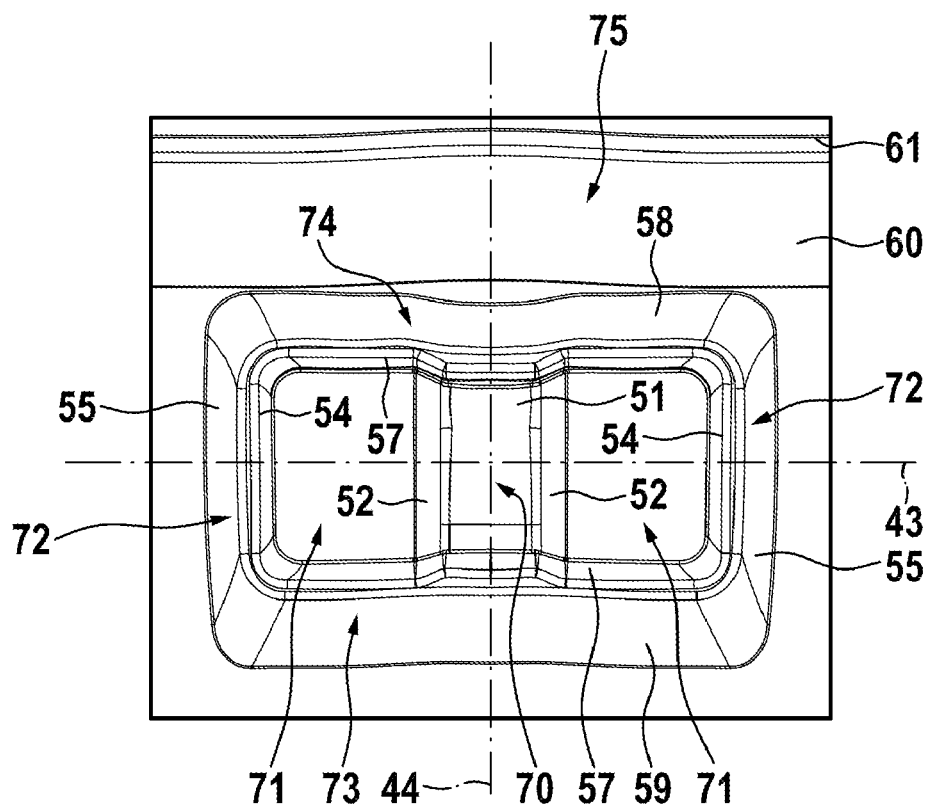
FIG. 7 shows an optical system in a plan view.

FIG. 7 shows the optical system in a plan view. The individual part elements are also designated here. A first sectional plane 43 and a second sectional plane 44 are indicated to which reference will be made subsequently. The central optical element 70 has an optical surface which is delimited on opposite side by connecting sections 52 and which goes over into the outer optical regions 71. A second optical element encloses both the central optical element and also the outer optical regions. To this end the second optical element has two transverse sides 72 which preferably have convex sections 54 and 55, that is like two longitudinal sides 73 and 74 which preferably have an inner convex side 57 and an outer concave side 59 or an outer convex side 58.

Figure 8:
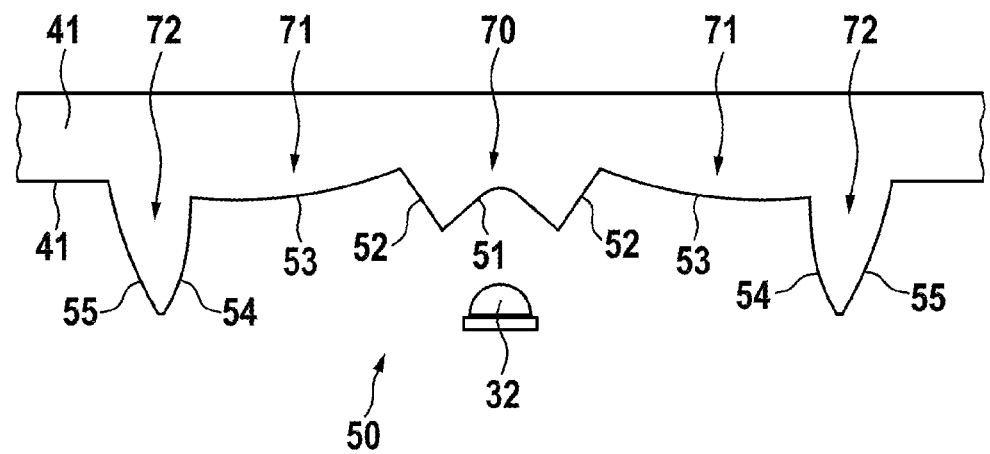
FIG. 8 shows an embodiment of an optical system in a first cross-section.
Figure 9:
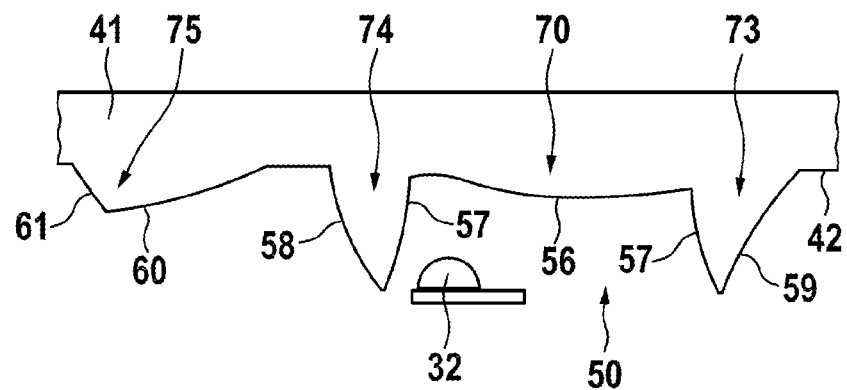
FIG. 9 shows the embodiment of the preceding figure in a second cross-section.

In order to be able to discuss in detail the geometry of an exemplary embodiment of an optical system for a light module 10 reference is made to FIGS. 8 to 9. FIGS. 8 and 9 show two cross-sections through the transparent cover 41 which lie perpendicular to one another in cross-sectional planes. In this case FIG. 8 shows the plane principally responsible for the large range of the light distribution. FIG. 9 shows an asymmetrical cross-sectional area. It can be seen in FIG. 8 that there is provided centrally a central optical element 70 preferably comprising a central section 51 which is concave at least in a piecewise manner, which intercepts a large proportion of the light from the illuminant 32. Particularly preferably the central section 51 is designed in the manner of a Gaussian curve (convex-concave-convex). Two connecting sections 52 then extend to the adjacent outer optical regions 71 having preferably convex sections 53. In principle the convex outer surfaces 71 are a continuation of the inner surface of the central section 51, interrupted by the connecting sections 52 which reduce the wall thickness of the optics (similar to a Fresnel lens). These are enclosed by the second optical element 72 which preferably comprises the convex sections 54, 55. The resulting nose-shaped continuations can be in direct contact with the circuit board 30. Illuminants 32 are preferably surrounded by the optical system 50 so that light from the illuminant 32 is coupled into the optical system 50.

FIG. 9 shows a cross-section perpendicular to FIG. 8 where a substantially flat or significantly less strongly curved configuration of the optically active surfaces can be seen. An asymmetry with regard to the cross-sections of the optical system 50 is thereby produced so that accordingly an asymmetric, in particular rectangular illumination by the light module can be achieved. The central region 70 thus has an only weakly curved central section 56. The central region 70 is adjoined by the second optical element which here has differently configured sides. Here preferably a first longitudinal side 74 has two convex sides 57, 58 whereas the second longitudinal side 73 has a convex side 57 and a concave side 59. Located behind the first longitudinal side 74 is the third optical element 75 which preferably has two convex sides. The first longitudinal side 74 acts as a total reflection surface which, as a result of its proximity to the light source, reflects a high proportion of the light from the region "behind the light" onto the front side.

Figure 10:
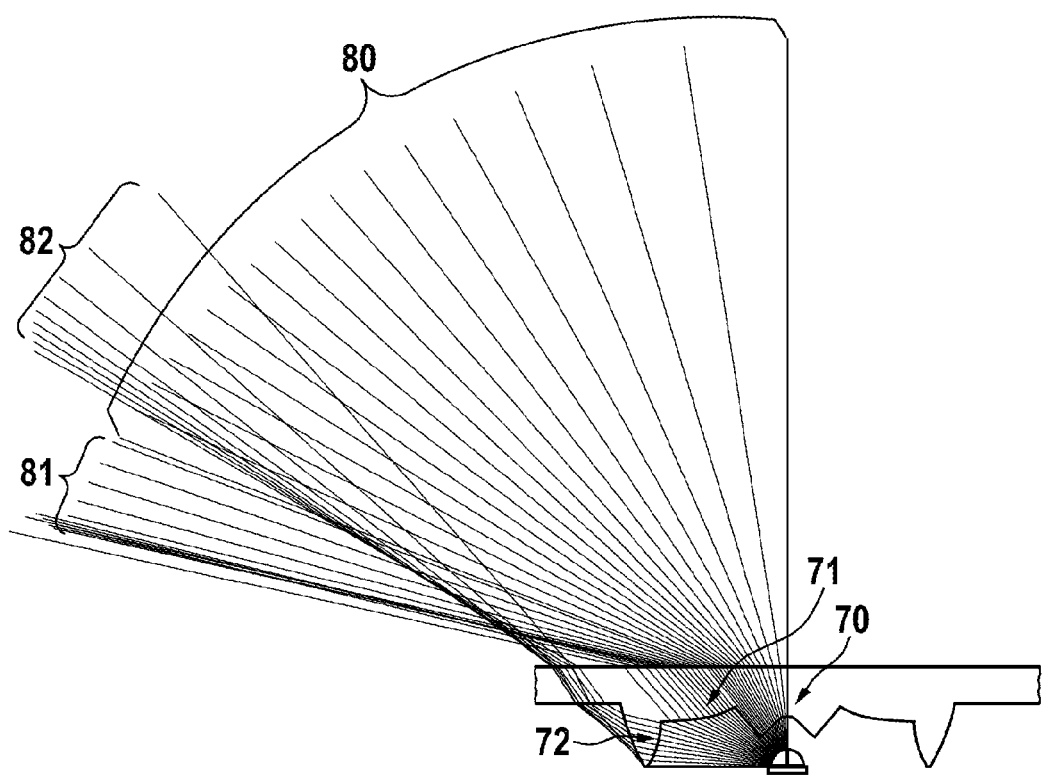
FIG. 10 shows beam paths in a first cross-section.

FIG. 10 shows beam paths in the first cross-section. For the sake of clarity only the left half is shown here. As a result of the symmetry of the arrangement the right half is mirror-symmetrical to this through the centre of the LED. Light passing through the central optical element 70 from the LED follows the beam paths 80. This is the central illumination field of the arrangement. Furthermore, light guided through the outer optical regions 71 follows the beam paths 81. Finally as a result of guidance of the light through the second optical element the beam paths 82 are obtained which preferably again illuminate the area illuminated by the beam paths 80. This ensures a higher light intensity in the mostly only weakly illuminated edge zones.

Figure 11:
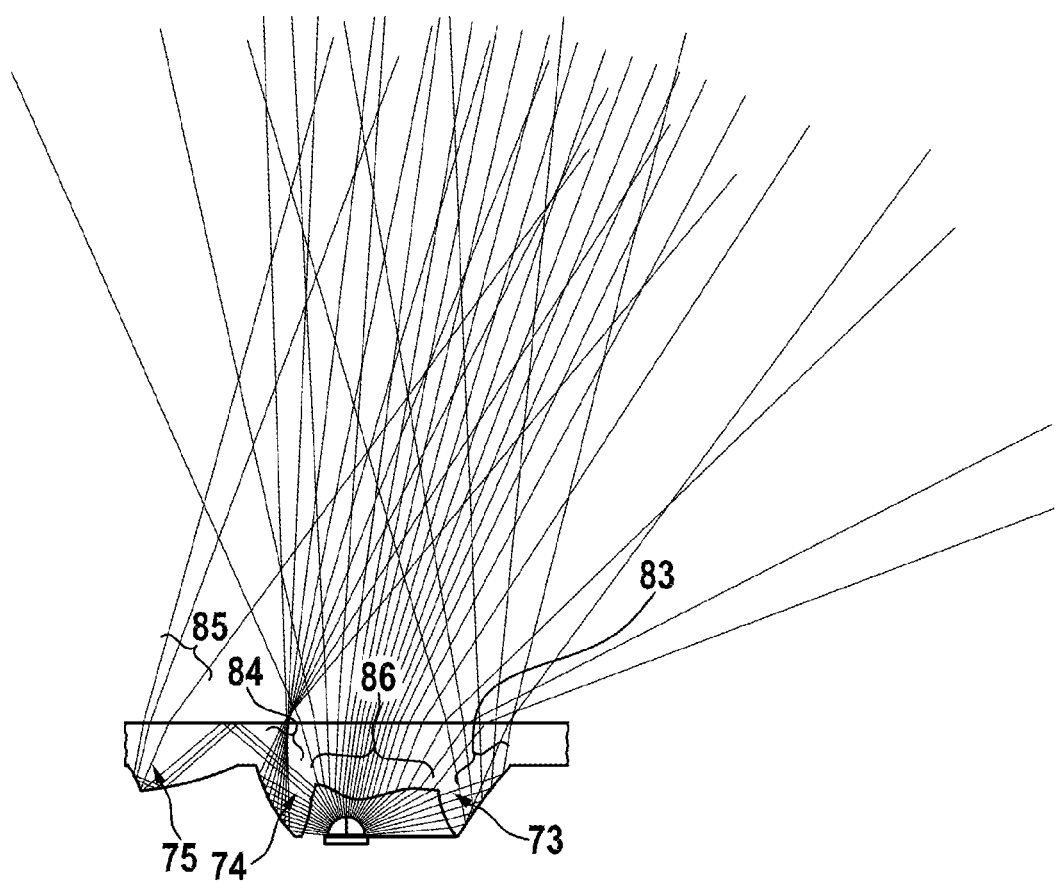
FIG. 11 shows beam paths in a second cross-section.

FIG. 11 shows beam paths in the second cross-section. Here light passing through the central optical element 71 is guided by means of the beam paths 86 in a central region. Light guided through the sides 73 or 74 of the second optical element is deflected according to the beam paths 73 or 74 in the direction of the central region. Likewise, light guided through the third optical element 75 is guided according to the beam paths 85 into the central region.

It will be appreciated to those skilled in the art having the benefit of this disclosure that this invention is believed to provide light module for an exterior light. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

10 Light module
20 Circuit board holder
30 Circuit board
32 Illuminant
40 Cover
41 Transparent cover
42 Inner side of transparent cover
43 First sectional plane
44 Second sectional plane
50 Optical system
51 Central section
52 Connecting section
53, 54, 55 Convex section
56 Central section
57, 58, 60, 61 Convex side
59 Concave side
70 Central optical element
71 Outer optical region
72 Second optical element, transverse side
73, 74 Second optical element, longitudinal sides
75 Third optical element
80, 86 Beam path through the central optical element
81 Beam path through the outer optical regions
82, 83, 84 Beam path through the second optical element
85 Beam path through the third optical element
100 Exterior light

The invention claimed is:

1. A light module for an exterior light, comprising a circuit board holder, at least one circuit board disposed in the circuit board holder and comprising a plurality of light-emitted diodes (LEDs) each configured to generate light having a beam path, a cover which covers the circuit board holder and the circuit board disposed therein, the cover comprising a transparent cover which is permeable to light in order to transmit light produced by the plurality of LEDs and which has on an inner side a plurality of optical systems for influencing the beam path, wherein only one of the plurality of optical systems is assigned to each of the plurality of LEDs, and wherein the optical systems each comprise: a central optical element, which is disposed directly above the assigned one of the plurality of LEDs, two outer optical regions on the opposite sides of the central optical element, a second optical element which laterally encloses the central optical element and the two outer optical regions and has at least one longitudinal side, and a third optical element which extends linearly outside the second optical element parallel to a longitudinal side of the second optical element.

2. The light module according to claim 1, wherein the outer side of the transparent cover is configured to be planar at least in sections.

3. The light module according to claim 1, wherein the optical systems are configured for an asymmetric distribution of the light.

4. The light module according to claim 1, wherein the optical systems are configured for a high range with large emission angles of the light.

5. The light module according to claim 1, wherein each optical system is formed by a recess and/or elevation on the inner side of the transparent cover.

6. The light module according to claim 5, wherein each optical system has a first cross-section in a first cross-sectional plane and a second cross-section in a second cross-sectional plane perpendicular to the first cross-sectional plane, wherein the first cross-section and the second cross-section are formed differently.

7. The light module according to claim 6, wherein the central optical element is configured to be concave and/or convex-concave-convex in the first cross-section at least in a piecewise manner.

8. The light module according to claim 6, wherein the two outer optical regions in the first cross-section are configured to be convex.

9. The light module according to claim 6, wherein each optical system further comprises:

one connecting section between the central optical element and the two outer optical regions, which runs parallel to the beam path.

10. The light module according to claim 6, wherein the second optical element has convex sides in the first cross-section.

11. The light module according to claim 6, wherein the second optical element has convex sides in the second cross-section and at least one concave side.

12. The light module according to claim 6, wherein the third optical element has convex sides in the second cross-section.

13. The light module according to claim 1, wherein the plurality of LEDs are each disposed off-center relative to the respective optical system.

14. An exterior light comprising at least one light module according to claim 1.

* * * * *